United States Patent
Wu et al.

(10) Patent No.: US 11,705,849 B2
(45) Date of Patent: Jul. 18, 2023

(54) METHOD FOR DISCHARGING ELECTRIC VEHICLE INVERTER

(71) Applicant: FORD GLOBAL TECHNOLOGIES, LLC, Dearborn, MI (US)

(72) Inventors: Ji Wu, Ann Arbor, MI (US); Wei Wu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/491,703

(22) Filed: Oct. 1, 2021

(65) Prior Publication Data

US 2023/0106366 A1    Apr. 6, 2023

(51) Int. Cl.
*H02P 27/08* (2006.01)
*H02M 7/5387* (2007.01)
*B60L 50/60* (2019.01)
*B60K 6/28* (2007.10)
*B60K 6/26* (2007.10)

(52) U.S. Cl.
CPC ........ *H02P 27/08* (2013.01); *H02M 7/53871* (2013.01); *B60K 6/26* (2013.01); *B60K 6/28* (2013.01); *B60L 50/60* (2019.02); *B60Y 2200/91* (2013.01); *B60Y 2200/92* (2013.01); *B60Y 2400/61* (2013.01); *H02P 2207/05* (2013.01)

(58) Field of Classification Search
CPC ...... H02P 21/00; H02P 21/0003; H02P 21/06; H02P 21/08; H02P 21/10; H02P 21/12; H02P 21/14; H02P 21/20; H02P 21/22; H02P 21/26; H02P 21/28; H02P 21/34; H02P 23/00; H02P 23/0004; H02P 23/14; H02P 23/30; H02P 25/00; H02P 25/022; H02P 25/064; H02P 25/28; H02P 27/00; H02P 27/04; H02P 27/06; H02P 27/08; H02P 29/00; H02P 27/662; H02P 2207/05

See application file for complete search history.

(56) References Cited

U.S. PATENT DOCUMENTS

| 8,120,200 B2 * | 2/2012 | Walters ................. B60W 10/26 307/64 |
| 8,884,567 B2 | 11/2014 | Senkou et al. |
| 9,124,211 B2 | 9/2015 | Suzuki |
| 10,148,209 B2 | 12/2018 | Treharne et al. |
| 10,547,222 B2 | 1/2020 | Saito et al. |

FOREIGN PATENT DOCUMENTS

CN    102170260 A * 8/2011 .......... H02P 21/0003

\* cited by examiner

*Primary Examiner* — Antony M Paul
(74) *Attorney, Agent, or Firm* — David B Kelley; Brooks Kushman P.C.

(57) ABSTRACT

A vehicle includes a battery, an inverter, a permanent magnet electric machine, and a controller. The controller commands discharge of a storage element of the inverter through the permanent magnet electric machine via a current having a zero quadrature axis component and a positive direct axis component.

12 Claims, 3 Drawing Sheets

METHOD FOR DISCHARGING ELECTRIC VEHICLE INVERTER

TECHNICAL FIELD

The present disclosure relates to a method for discharging an inverter on an electric vehicle.

BACKGROUND

Electric vehicles are propelled by a DC high-voltage (HV) battery supplying power to an AC electric motor. An inverter is used to convert the DC power into AC power. A DC bus capacitor connected between positive and negative HV buses may be discharged by applying current on a d-axis of the motor after the vehicle is parked. A resolver offset is characterized once the electric machine is assembled and this offset is used to adjust a rotor position reading in a motor controller such that a current angle can be properly aligned to desired rotor position, relative to a magnetic circuit. The resolver offset may have some amount of error due to resolver design, measurement method, or current control accuracy. If a resolver offset error occurs, a q-axis current may be produced which in turn produces torque.

SUMMARY

A vehicle includes a battery, an inverter, a permanent magnet electric machine, and a controller. The controller commands discharge of a storage element of the inverter through the permanent magnet electric machine via a current having a zero quadrature axis component and a positive direct axis component.

A method for a vehicle includes commanding discharge of a storage element of an inverter through a permanent magnet machine via a current having a zero quadrature axis component and a positive direct axis component.

A vehicle includes a battery, an inverter, an electric machine including permanent magnets, and a controller. The controller commands discharge of a storage element of the inverter through the electric machine via a current having a current angle that results in an increase in magnetic field strength aligned with a magnetic field of the permanent magnets.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
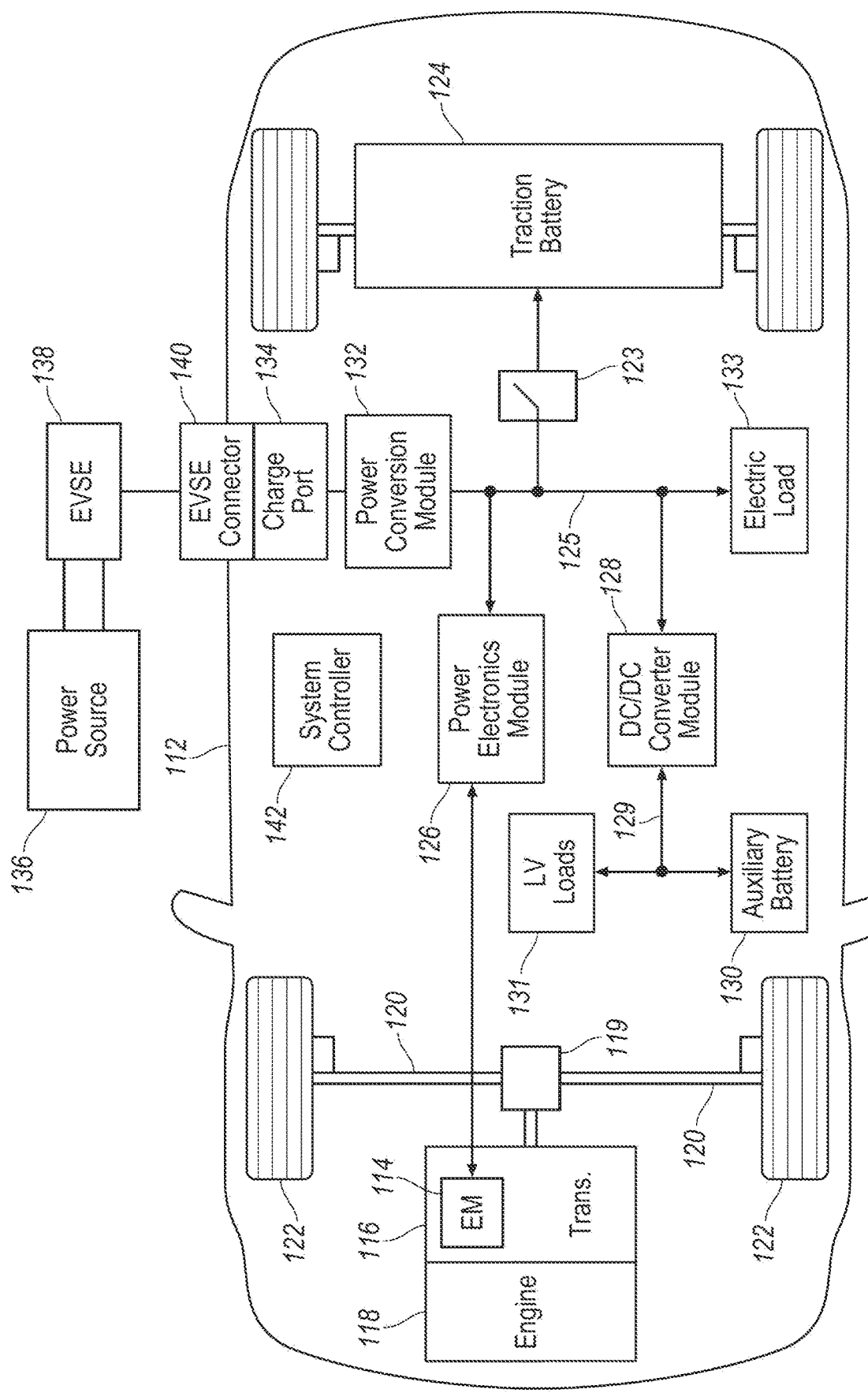
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 119 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 119. The electric machines 114 can provide propulsion and slowing capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 123 may include one or more contactors configured to isolate the traction battery 124 from a high-voltage bus 125 when opened and connect the traction battery 124 to the high-voltage bus 125 when closed. The high-voltage bus 125 may include power and return conductors for carrying current over the high-voltage bus 125. The contactor module 123 may be located in the traction battery 124. One or more power electronics modules 126 may be electrically coupled to the high-voltage bus 125. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 125 to a low-voltage DC level of a low-voltage bus 129 that is compatible with low-voltage loads 131. An output of the DC/DC converter module 128 may be electrically coupled to an auxiliary battery 130 (e.g., 12V battery) for charging the auxiliary battery 130. The low-voltage loads 131 may be electrically coupled to the auxiliary battery 130 via the low-voltage bus 129. One or more high-voltage electrical loads 133 may be coupled to the high-voltage bus 125. The high-voltage electrical loads 133 may have an associated controller that operates and controls the high-voltage electrical loads 133 when appropriate. Examples of high-voltage electrical loads 133 may be a fan, an electric heating element, and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 125. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 142 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The electric machines 114 may be a permanent magnet synchronous motor (PMSM) type machine. A PMSM electric machine includes a rotor and a stator. The stator may include windings for producing a magnetic field to rotate the rotor. Current through the stator windings may be controlled to vary the magnetic field acting on the rotor. The rotor of a PMSM includes permanent magnets that create a magnetic field that interacts with the stator magnetic field to cause rotation of the rotor. The rotor speed may be controlled by the frequency of the magnetic field created by the stator.

The electric machines 114 may be comprised of a stator that includes stator windings and a rotor. The rotor may rotate about a central axis relative to the stator. The electric machines 114 may be controlled by flowing a generally sinusoidal current through stator windings. The amplitude and frequency of the current may be varied to control the torque and speed of the rotor. The stator current creates an electromagnetic field that interacts with the permanent magnets that are part of the rotor. This electromagnetic field causes the rotor to rotate. The electric machines 114 may be configured as three-phase machines. That is, the stator windings may include three separate phase windings. To control the electric machines 114, a three-phase voltage or current waveform is applied to the phase windings. The three-phase waveform is such that each phase signal is separated by a phase difference of 120 degrees.

Figure 2:
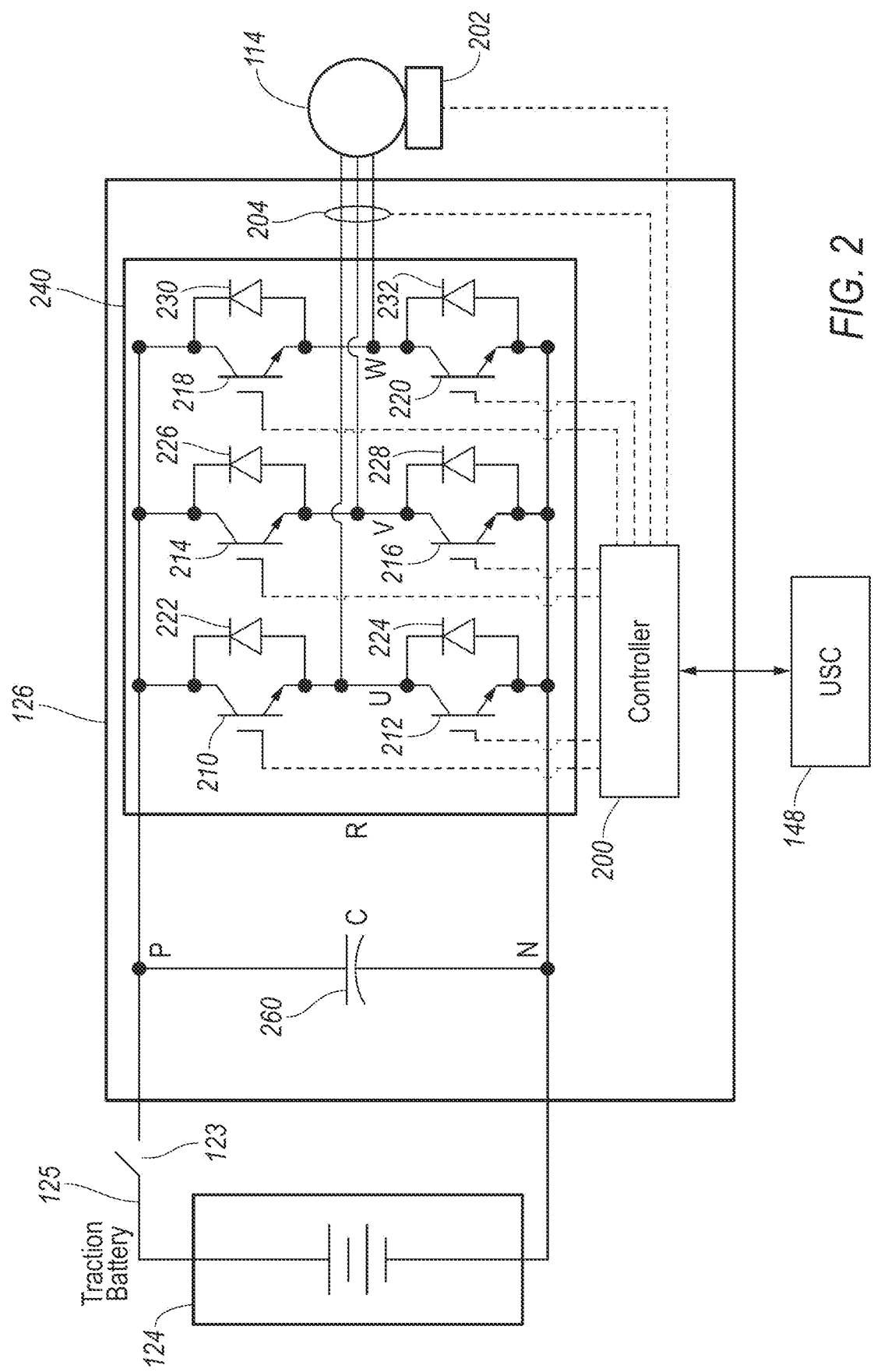
FIG. 2 depicts a possible configuration for a vehicle system including power electronics associated with an electric machine.

The electric machines 114 may be coupled to the power electronics module 126 via one or more conductors that are associated with each of the phase windings. FIG. 2 depicts a block diagram of a vehicle system that includes a motor control system. The vehicle 112 may include one or more power electronics controllers 200 configured to monitor and control the power electronics module 126. The conductors may be part of a wiring harness between the electric machine 114 and the power electronics module 126. A three-phase electric machine 114 may have three conductors coupled to the power electronics module 126. The power electronics module 126 may be configured to switch positive and negative terminals of the high-voltage bus 125 to phase terminals of the electric machines 114.

The power electronics module 126 may be controlled to provide sinusoidal voltage and current signals to the electric machine 114. The frequency of the signals may be proportional to the rotational speed of the electric machine 114.

The controller 200 may be configured to adjust the voltage and current output of the power electronics module 126 at a predetermined switching frequency. The switching frequency may be the rate at which the states of switching devices within the power electronics module 126 are changed. The frequency of the injection voltage may be selected as a predetermined multiple of the switching frequency.

The power electronics module 126 may interface with a position/speed feedback device 202 that is coupled to the rotor of the electric machine 114. For example, the position/speed feedback device 202 may be a resolver or an encoder. The position/speed feedback device 202 may provide signals indicative of a position and/or speed of the rotor of the electric machine 114. The power electronics 126 may include a power electronics controller 200 that interfaces to the speed feedback device 202 and processes signals from the speed feedback device 202. The power electronics controller 200 may be programmed to utilize the speed and position feedback to control operation of the electric machine 114.

The power electronics 126 may include power switching circuitry 240 that includes a plurality of switching devices 210, 212, 214, 216, 218, 220. The switching devices may be Insulated Gate Bipolar Junction Transistors (IGBTs) or other solid-state switching devices. The switching devices may be configured to selectively couple a positive terminal and a negative terminal of the high-voltage bus 125 to each phase terminal or leg (e.g., labeled U, V, W) of the electric machine 114. Each of the switching devices within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A first switching device 210 may selectively couple the HV-bus positive terminal to a first phase terminal (e.g., U) of the electric machine 114. A first diode 222 may be coupled in parallel to the first switching device 210. A second switching device 212 may selectively couple the HV-bus negative terminal to the first phase terminal (e.g., U) of the electric machine 114. A second diode 224 may be coupled in parallel to the second switching device 212. A third switching device 214 may selectively couple the HV-bus positive terminal to a second phase terminal (e.g., V) of the electric machine 114. A third diode 226 may be coupled in parallel to the third switching device 214. A fourth switching device 216 may selectively couple the HV-bus negative terminal to the second phase terminal (e.g., V) of the electric machine 114. A fourth diode 228 may be coupled in parallel to the fourth switching device 216. A fifth switching device 218 may selectively couple the HV-bus positive terminal to a third phase terminal (e.g., W) of the electric machine 114. A fifth diode 230 may be coupled in parallel to the fifth switching device 218. A sixth switching device 220 may selectively couple the HV-bus negative terminal to the third phase terminal (e.g., W) of the electric machine 114. A sixth diode 232 may be coupled in parallel to the sixth switching device 220.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the HV-bus positive terminal or the HV-bus negative terminal at a particular time.

Various motor control algorithms and strategies are available to be implemented in the power electronics controller 200. The power electronics module 126 may also include current sensors 204. The current sensors 204 may be inductive or Hall-effect devices configured to generate a signal indicative of the current passing through the associated circuit. In some configurations, two current sensors 204 may be utilized and the third phase current may be calculated from the two measured currents. The controller 200 may sample the current sensors 204 at a predetermined sampling rate. Measurement values for the phase currents of the electric machine 114 may be stored in controller memory for later computations.

The power electronics module 126 may include one or more voltage sensors. The voltage sensors may be configured to measure an input voltage to the power electronics module 126 and/or one or more of the output voltages of the power electronics module 126. The voltage sensors may be resistive networks and include isolation elements to separate high-voltage levels from the low-voltage system. In addition, the power electronics module 126 may include associated circuitry for scaling and filtering the signals from the current sensors 204 and the voltage sensors.

Under normal operating conditions, the power electronics controller 200 controls operation of the electric machine 114. For example, in response to torque and/or speed setpoints, the power electronics controller 200 may operate the switching devices 210, 212, 214, 216, 218, 220 to control the torque and speed of the electric machine 114 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with Pulse Width Modulated (PWM) signals to control the torque and speed of the electric machine 114. The power electronics controller 200 may implement various well-known control strategies to control the electric machine 114 using the switching devices such as vector control and/or six-step control. During normal operating conditions, the switching devices 210, 212, 214, 216, 218, 220 are actively controlled to achieve a desired current through each phase of the electric machine 114.

The power electronics module 126 may further include one or more capacitors connected across the high-voltage bus 125. For instance, a DC bus capacitor 260 (DC link capacitor) may be connected across the high-voltage bus 125 to maintain the voltage drop between the positive and negative terminals of the high-voltage bus 125. The DC bus capacitor 260 may be further configured to filter ripple currents generated at battery 124 and stabilize the voltage across the high-voltage bus 125. Although the DC bus capacitor 260 is illustrated as a single capacitor in FIG. 2, it is noted that the present disclosure is not limited thereto and the DC bus capacitor 260 may include a plurality of capacitors under various configurations. When the power electronics module 126 is in operation, the DC bus capacitor 260 is charged such that the voltage across the positive and negative terminals of the high-voltage bus 125 may be maintained. When the vehicle is parked and switched off, the DC bus capacitor 260 may be discharged to discharge the high-voltage bus 125. The power electronics controller 200 may apply a discharge current on the d-axis to create loss in electric machine windings which in turn discharges energy stored in the DC bus capacitor 260 when the vehicle is parked. The discharge current is preferably applied only to the d-axis of the electric machine 114 without any q-axis component such that the DC bus capacitor 260 may be discharged without causing any rotor rotation of the electric machine 114.

A resolver offset is characterized once the electric machine is assembled and this resolver offset is used to adjust the rotor position reading in the power electronics controller 200 so that current angle can be properly aligned to the desired rotor position, relative to a magnetic circuit. In other words, the power electronics controller 200 needs an accurate resolver offset value to precisely apply the discharge current to the d-axis only without incurring any q-axis component. However, there may be a certain amount of error in the resolver offset in each electric machine affecting the position reading of the rotor position by the power electronics controller 200. When a resolver offset error occurs, a q-axis current is produced which in turn produces torque to the electric machine 114 which is undesirable when the vehicle is parked.

Figure 3:
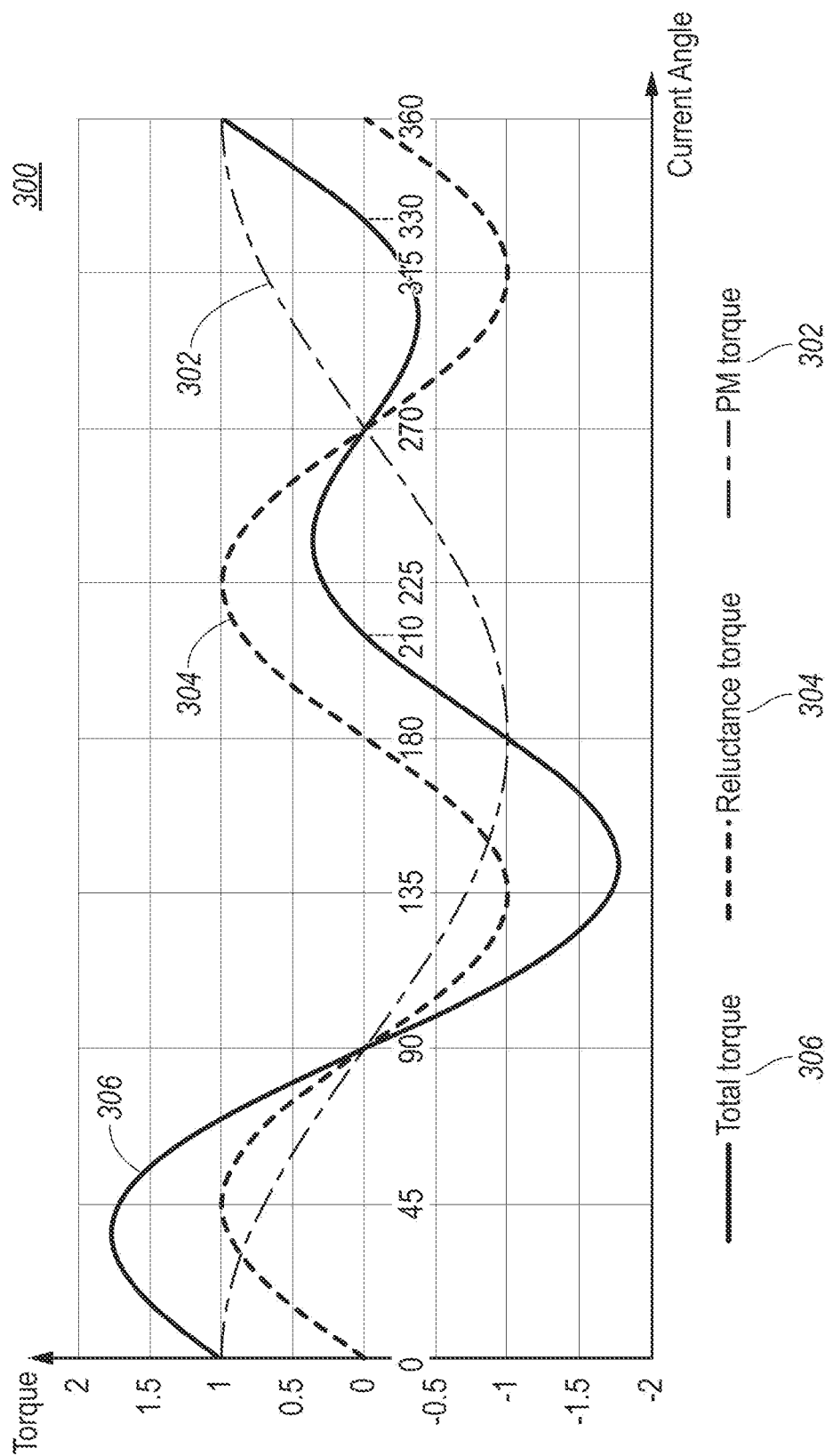
FIG. 3 depicts a waveform diagram of a motor torque at different current angles.

FIG. 3 depicts a waveform diagram 300 for motor torque corresponding to different current angles. The horizontal axis of the waveform diagram 300 depicts a phase angle (β of a current (current angle) applied to the stator with reference to the rotor. The vertical axis depicts a torque output by the electric machine 114 in normalized value. As illustrated, the waveform diagram 300 depicts a permanent magnet torque 302 that is generated by the interaction between the stator magnetic flux due to the current in the winding and the rotor magnetic flux due to the permanent magnet. The waveform diagram 300 further depicts a reluctance torque 304 that is generated by the rotor moving to a position where the reluctance seen by the stator flux is declining. Both the permanent magnet torque 302 and the reluctance torque 304 may be characterized by sinusoidal waveforms but having different cycles. In the present example, the permanent magnet torque 302 has a 360 degree cycle while the reluctance torque 304 has a 180 degree cycle. A total torque 306 represents a combined torque of the permanent magnet torque 302 and the reluctance torque 304. The total torque 306 may be represented via the following equation:

$$T_e = \frac{3}{2}\frac{P}{2}(\lambda_m I_q + (L_d - L_q)I_d I_q) \quad (1)$$

wherein P denotes a number of poles in the electric machine 114, $\lambda_m$ denotes a magnetic flux linkage due to permanent magnet, $I_q$ denotes a q-axis current, $I_d$ denotes a d-axis current, $L_d$ denotes a d-axis inductance, and $L_q$ denotes a q-axis inductance. In the above equation, $\lambda_m I_q$ represents the permanent magnet torque component and $(L_d - L_q)I_d I_q$ represents a reluctance torque component. The above equation (1) may be further developed into:

$$T_e = T_{pm} + T_{rl} \quad (2)$$

$$T_{pm} = k_{pm} * \cos(\beta) \quad (3)$$

$$T_{rl} = k_{rl} * \sin(2\beta) \quad (4)$$

wherein $k_{pm}$ denotes a permanent magnet torque constant, and $k_{rl}$ denotes a reluctance torque constant.

In order to discharge the DC bus capacitor 260 without causing any rotor rotation on the electric machine 114, the power electronics controller 200 needs to apply the discharge current to the electric machine 114 at a correct position when the total toque 306 is at zero. According to the above equations (2) to (4) as well as illustrated in FIG. 3, the total torque 306 passes across zero when the current angle β is at 90 degrees and 270 degrees at which points both the permanent magnet torque 302 and the reluctance torque 304 are at zero. Additionally, the total torque 306 passes across zero at around 210 degrees and 330 degrees current angle β when the permanent magnet torque 302 and the reluctance torque 304 having the same magnitude but at opposite directions cancel out each other. Therefore, if the discharge current is applied to the electric machine 114 at, 90 degrees, 270 degrees, 210 degrees, or 330 degrees current angle β, the discharge current will not cause any rotor rotation. The above four current angles β may be defined as designated current angles for discharging the DC bus capacitor 260. The designated current angles may be further classified as a first group of designated current angles having one or more designated current angles from which the magnitude of the magnet torque 302 and magnitude of the reluctance torque 304 increase from zero in the same direction. In the present example, the first group includes the 90 degree current angle β. As illustrated in FIG. 3, when the current angle decreases from 90 degrees, the magnitude of the magnet torque 302 and magnitude of the reluctance torque 304 increase in the same positive direction. When the current angle increases from 90 degrees, the magnitude of the magnet torque 302 and magnitude of the reluctance torque 304 increase in the same negative direction.

The designated current angles may be further classified as a second group of designed current angles having one or more designated current angles from which the magnitude of the magnet torque 302 and magnitude of the reluctance torque 304 increase from zero in the opposite directions. In the present example, the second group includes the 270 degrees current angle β. As illustrated in FIG. 3, when the current angle decreases from 270 degrees, the magnitude of the magnet torque 302 increases in the negative direction whereas the magnitude of the reluctance torque 304 increases in the positive direction. When the current angle increases from 270 degrees, the magnitude of the magnet torque 302 increases in the positive direction whereas the magnitude of the reluctance torque 304 increases in the negative direction.

The designated current angles may be further classified as a third group of designed current angles having one or more designated current angles at which a non-zero magnet torque 302 and a non-zero reluctance torque 304 cancel out each other resulting in a zero total torque 306. In the present example, the third group includes the 210 degrees and 330 degrees current angle β.

Due to the error of the resolver offset as discussed above, the power electronics controller 200 may not accurately measure the rotor position of the electric machine. Therefore, there may be a current angle error when the power electronics controller 200 discharges the DC bus capacitor 260 and the discharge current may not be perfectly applied to the electric machine at the designated current angle β. Taking the current angle error into account, the second group of current angles may be the most preferable option for current discharge because the current angle error may cause a smaller magnitude of total toque and thus a lesser degree of undesired rotor rotation.

As illustrated in FIG. 3, if the power electronics controller 200 discharges the DC bus capacitor 260 at the first group of designated current angle β of 90 degrees, a current angle error (e.g. +/−3 degrees) may cause a significant total torque 306 as the permanent magnet torque 302 and the reluctance torque 304 in the same direction add up to each other. Such a total torque may cause a significant rotor rotation which is undesired. However, if the power electronics controller 200 discharges the DC bus capacitor 260 at the second group of designated current angle β of 270 degrees, a same amount of current angle error (e.g. +/−3 degrees) may cause a torque 306 lesser than at the first group of designated current angle because the permanent magnet torque 302 and the reluctance torque 304 at opposite directions cancel out each other. Since the deviation of the magnitude of the permanent magnet torque 302 and magnitude of the reluctance torque 304 are not exactly the same, a small amount of total torque 306 may still be caused by the current angle error. However, since this total torque 306 is lesser compared with the same amount of current angle error applied to the first group of designated current angle β, a lesser degree of rotor rotation may be caused such that the user experience may be improved.

The first group and second group of the designated current angle β may be further explained using a direct component $I_d$ and quadrature component $I_q$ of the discharge current. With reference to FIG. 3, at 0 degrees current angle, the direct component $I_d$ is zero, and the quadrature component $I_q$ is positive. At 90 degrees current angle, the direct component $I_d$ is negative, and the quadrature component $I_q$ is zero At 180 degrees current angle, the direct component $I_d$ is zero, and the quadrature component $I_q$ is negative. At 270 degrees current angle, the direct component $I_d$ is positive, and the quadrature component $I_q$ is zero. In other words, if the power electronics controller 200 discharges the DC bus capacitor 260 at the second group of designated current angle β of 270 degrees, the current angle β may result in an increase magnetic field strength that is aligned with a magnetic field of permanent magnets of the permanent magnet electric machine. It is noted that the term aligned in the present disclosure is used a s general term and may include situations of approximate alignment within reasonable tolerance and errors.

According to the above equations (2) to (4) as well as illustrated in FIG. 3, the third group of current angles may be the second preferable for current discharge because the deviation of the total torque 306, although more significant than at the second group of current angles, is still less than at the first group of current angles. This is because the permanent magnet torque 302 and the reluctance torque 304 are at opposite directions when the current angle deviates from the third group of current angles.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery;
   an inverter;
   a permanent magnet electric machine; and
   a controller programmed to, responsive to a key-off event, command discharge of a storage element of the inverter through the permanent magnet electric machine via a current having a zero quadrature axis component and a positive direct axis component, wherein the controller is further programmed to command the discharge responsive to detecting a contact event.

2. The vehicle of claim 1, wherein the controller is further programmed to command the discharge responsive to a disconnect between the battery and permanent magnet electric machine.

3. The vehicle of claim 1, wherein the storage element includes one or more capacitors.

4. A method for a vehicle, comprising:
   responsive to detecting vehicle contact, commanding discharge of a storage element of an inverter through a permanent magnet machine via a current having a zero quadrature axis component and a positive direct axis component.

5. The method of claim 4, wherein the commanding is responsive to a detecting a key-off event.

6. The method of claim 4, wherein the commanding is responsive to a disconnect between a battery and the permanent magnet electric machine.

7. The method of claim 4, wherein the storage element includes one or more capacitors.

8. A vehicle comprising:
   a battery;
   an inverter;
   an electric machine including permanent magnets; and
   a controller programmed to command discharge of a storage element of the inverter through the electric machine via a current having a current angle that results in an increase in magnetic field strength aligned with a magnetic field of the permanent magnets.

9. The vehicle of claim 8, wherein the controller is further programmed to command the discharge to a key-off event.

10. The vehicle of claim 8, wherein the controller is further programmed to command the discharge responsive to detecting contact with the vehicle.

11. The vehicle of claim 8, wherein the controller is further programmed to command the discharge responsive to a disconnect between the battery and electric machine.

12. The vehicle of claim 8, wherein the storage element includes one or more capacitors.

\* \* \* \* \*